July 4, 1961 A. B. COLE ET AL 2,990,796

SUBMERSIBLE VESSEL

Filed Jan. 23, 1957

INVENTORS
ALLAN B. COLE
EMERY J. BALGA
BY
William F. Nickel
ATTORNEY

United States Patent Office 2,990,796

Patented July 4, 1961

2,990,796

SUBMERSIBLE VESSEL

Allan B. Cole and Emery J. Balga, New Orleans, La., assignors to Frederic R. Harris, Inc., New York, N.Y., a corporation of New York Filed Jan. 23, 1957, Ser. No. 635,729
14 Claims. (Cl. 114—.5)

This invention is an improved vessel or barge carrying a tank for receiving and storing crude oil as the liquid is discharged from a submarine well; and particularly a submersible vessel that can accumulate oil when located below the surface of a body of water; where it will not be disturbed by wave action or the condition of the weather.

An important object of this invention is to provide a vessel with a tank to be coupled to the flow line of an under-water oil well, and having means for easily sinking the vessel and raising it when the tank is full.

Another object is to provide a submersible vessel having a tank for accumulating oil and equipped with devices for automatically stopping the influx of oil when the tank is filled and the vessel ready to be raised to the surface.

A still further object of this invention is to provide a submersible vessel capable of accumulating oil from an under-water well, and capable when fully laden with oil, of raising itself by an increase in buoyancy from the bottom under water to the surface thereof.

A further object is to provide a submersible vessel having ballast tanks which can be flooded to submerge the vessel, and evacuated by the pressure of the gas coming from the oil line; so that, when such an operation is undertaken, no pumping is necessary to empty the ballast tanks.

An additional object is to provide a submersible vessel having an oil storage tank that can be charged with a fluid medium and the inside pressure set at a point that will permit a smooth and steady inflow of oil from the well. Hence the oil can be accumulated in the tank continuously and safely throughout the operation.

Still another object is to provide a submersible vessel having an oil storage tank that can be flooded with water, and so equipped that the water is automatically discharged as the oil is admitted, without expelling or losing any of the oil when all of the water in the tank has been removed.

Yet a further object is to provide an oil storage tank on the vessel with a separator, so connected to the tank that the oil is conducted into the tank, but the gas is by-passed into other conduits or lines to be delivered elsewhere, as may be required.

Also it is an object to provide the oil storage tank on the vessel with outlet valve mechanism that can be actuated by the oil in the tank to open a discharge vent for the water that originally floods the tank, as above set forth; but so controlled by the oil when the tank is filled with the oil that such mechanism automatically closes the discharge vent.

The objects and advantages of the invention are all fully made clear in the ensuing description, and the novel features are pointed out in the claims at the end of this specification. On the drawings a vessel incorporating the principle of my invention is illustrated; but we do not wish to be limited to the exact construction actually shown herein. Variations in many details may be adopted without omitting or materially altering any of the characteristics by which this invention is distinguished.

Figures 1, 2, 3, 4, 5:
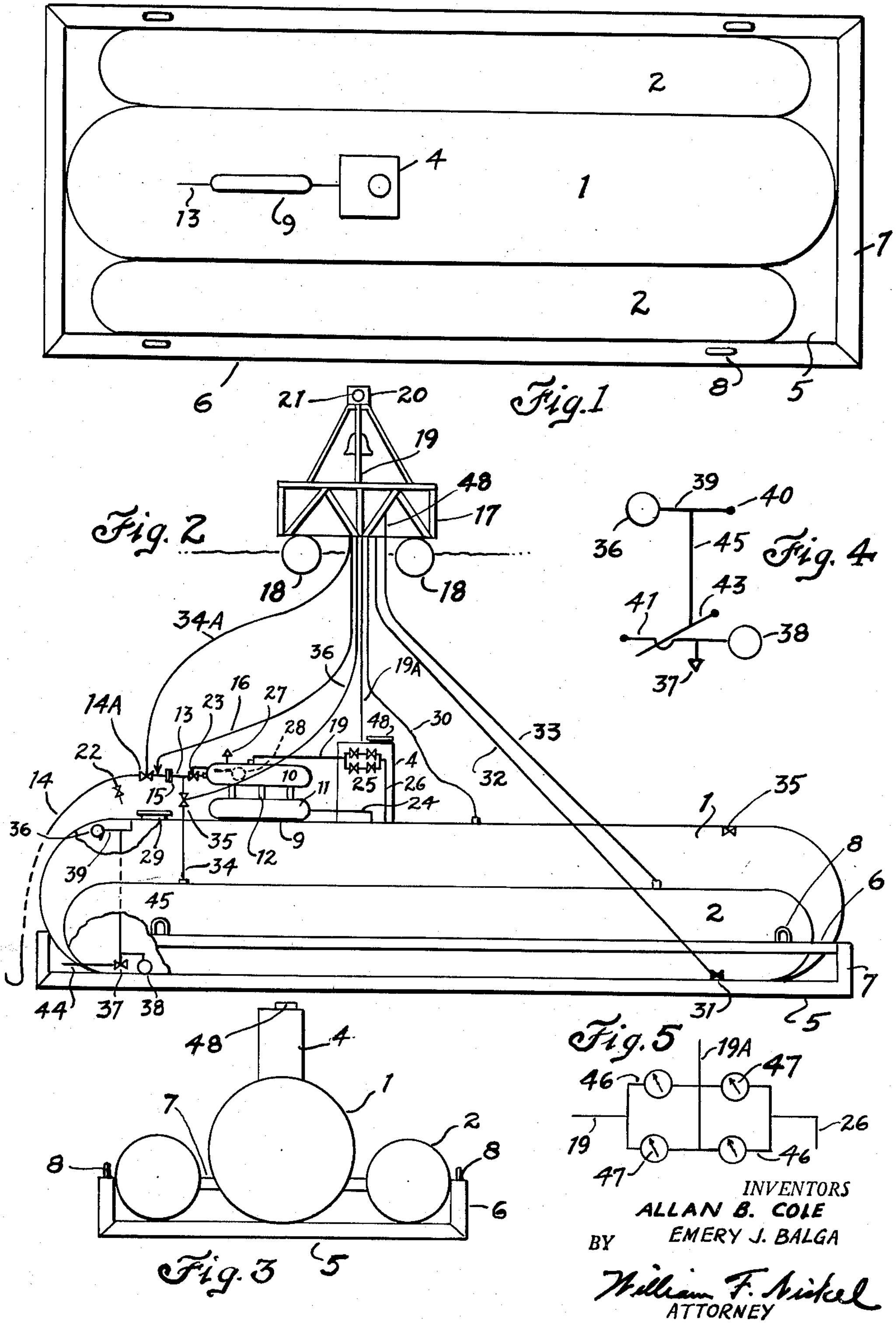
FIGURE 1 is a top plan thereof.
FIGURE 2 shows a side elevation of a submersible vessel according to this invention.
FIGURE 3 is an end elevation on a smaller scale.
FIGURES 4 and 5 are details of valve arrangements and connections.

The vessel carries an accumulator and storage tank 1, flanked by two outrigger or ballast tanks 2, which are flooded with water when the vessel is to be submerged. On top of the tank 1 is a water-tight housing 4 with room inside for controlling valves and other regulating devices. The tanks extend horizontally from end to end of the hull of the vessel, which has a flat bottom 5, side rails 6 and end rails 7, and the side rails have cleats 8 or the like for the attachment of cables to tow and moor the vessel.

On the top of the tank 1 is an oil and gas separator 9 comprising an upper header 10 and lower header 11, united by vertical pipes 12. The upper header has a short inlet pipe 13, and is joined to flow line 14 of the submarine oil well by a coupling 15. The flow line is long enough to be raised to the surface of the water, and is made fast to a cable or anchor chain 16 made fast at its upper end to a buoy comprising a framework 17, kept afloat by buoyant tanks 18. The framework carries a bell which rings as the buoy is rocked by the waves. From the upper header 10 of the separator 9 leads conduits 19, 19A to the buoy, which has a nozzle in a casing 20 on the top, so that the gas can be ignited to mark the position of the buoy at night. The casing 20 has lens-filled windows 21, colored in accordance with the requirements of navigation. The tank 1 thus has connections, including the separator 9, which can be completed to the flow line 14 on the surface before the vessel is sunk.

The flow line 14 has a bleeder valve 22 adjacent the coupling 15, and in the inlet pipe 13 is a valve 23 between coupling 15 and separator 9. When the line 14 is coupled to the inlet 13, the oil containing gas enters the separator, the gas passing into the conduit 19, and the oil into the lower header 11, which is connected by a pipe 24 passing into the housing 4 to store the oil in the tank 1. In the housing is an arrangement of valves 25 between the upper header 10, a gas discharge conduit 19A, and a pipe 26 leading to the tank 1. The upper header has a relief or safety valve 27, and the valve 23 in the pipe 13 is a high liquid level shut-off valve connected to a float 28 in the header to close this valve when the tank 1 and separator 9 are filled. The line 14 has a control valve 14A adjacent the coupling 15, and is connected to the well at its lower end.

At the outset water is admitted to the tank 1, and can be pumped in through the manhole 29, or at another point and the manhole is closed when the water is deep enough in the tank 1. Then air can be pumped into the tank 1 through the line 30 with its upper end at the surface, till the pressure of the air inside the tank above the water is raised to the required point. Next the tanks 2 are flooded with sea water, which enters through a valve 31, one for each tank 2, which can be opened or closed by an air line or electric connections 32 from the buoy 17. Air in the tanks 2 can be discharged through an air hose 33, also connected to the buoy 17. Valve 14A can be manually operated when the barge is floating, or when the barge has sunk to the bottom, the valve 14A in the line 14, which can be operated through an air line 34, or electric conductors leading up to the buoy 17, is opened and the influx of the oil into the tank 1 begins. As the oil enters the tank 1, it of course forms a layer on top of the water therein, and the air in the tank escapes through conduit 26 and valves 47 to discharge conduit 19A. When the oil rises high enough in the tank it will operate a float 36 therein connected to a discharge valve 37 in the lower part of the tank and water will be expelled through a pipe 44 controlled by the valve 37. This will continue till the oil is deep enough in the tank to reach float 38 connected to the valve 37. The buoyant effect of the water is enough to actuate the float 38 so as to keep the valve open, but the oil being less dense, will not do this, the float 38 being designed accordingly. Therefore when the lower level of the oil in the tank 1 reaches the float 38, the valve 37 will close. The tank is now filled, and the admission of more oil is prevented by the high level shut-off valve 23 and float 28 in the upper header 10 of the separator 9.

The vessel can now be raised to the surface by evacuating the water from the ballast tanks 2. For this purpose the outlet valve 31 in each of these tanks can be opened again by means of air or electric current in each line 32 attached to the buoy 17, and air can pass through the line 33 to expel the water by way of valves 31. The vessel then lifts easily from the ocean bed and can be disconnected from the buoy 17 and towed off. The line 33 can of course serve as an exhaust line for air in the tanks 2, and to conduct compressed air into these tanks by connecting it to a pump or air reservoir.

Also, the pressure of the oil and the gas therein can be utilized to de-water the tanks 2. For this purpose a branch 34 connects the pipe 13 between the coupling 15 and valve 23 to each tank 2, and in the pipes 34 are valves 35 that can be opened by operation of lines 36 connected to the buoy 17. When the tank 1 is filled, the tanks 2 are put into communication with the oil line 14 and the pressure of the gas in the oil is sufficient to empty the tanks 2 of water, and the buoyant effect of the lighter oil in the tank 1 and the gas in the tanks 2 is sufficient to lighten the vessel and lift it to the surface.

Of course the power to operate the lines to the various valves is supplied by equipment on the vessel which tows the vessel into position to be submerged at the well from which the oil is to be recovered.

FIGURE 4 shows how the valve 37 in the bottom of the tank 1 is controlled. The float 36 in the upper part of the tank 1 is mounted on an arm 39 pivoted at one end as shown at 40, and the valve 37 in the lower part of the tank is mounted on arm 41 pivoted at one end and having a float 38 at the opposite end. A pivoted arm 43 lies with one end on top of the arm 41, the valve 37, which is in an outlet pipe 44, being between the arm 43 and float 38. This arm 43 is connected by link 45 to the arm 39. Ordinarily the weight of the float 36, arm 39, link 45 and arm 43 will hold the arm 41 down and keep the valve 37 in closed position, but when the oil reaches the level of the float 36 it will cause this float to lift the arm 39, link 45 and arm 43, and then the buoyant effect of the water on the float 38 will be sufficient to open the valve 37. The arm 43, with lever 39 and float 36 is in effect a latch that holds and releases the arm 41 and valve 37.

In the line of the conduits 19 and 19A leading from the upper header 10 to the buoy 17 there are a pair of branch conduits 46 in the housing 4. These branch conduits are in parallel and the conduit 19 joins both branches at one end of the branches while the conduit 26 leading to the tank joins the two conduits 46 at the other end.

The conduit 19A leading up to the buoy is joined to the mid-point of both branches 46. At both sides of this point of junction in each pipe 46 is a one-way back pressure valve 47. Gas entering the housing 4 will thus flow past either valve 47 and up to the float 17, and air and gas vapor from tank 1 will flow thru conduit 26 and pass thru valves 47 and up to the float. If one of these valves, for example, one of the upper valves 47 shown in FIGURE 5, should fail to work, the gas can go through the lower branch, the gas now passing from the mid-point of the lower line 46 to the conduit 19A and up to the buoy 17 and the oil to the pipe 24.

The housing 4 also has a manhole 48, which is tightly closed by a cover when the vessel is sunk. The valves 47 are back-pressure regulating valves for gas coming from the separator and air and gas from the tank 1; a valve for each source being thus provided, and a spare for each in case of failure.

FIGURE 4 is diagrammatic only and any suitable arrangement of valves for this purpose can be adopted.

The line 33 can be used for venting the air from the tanks 2, or for supplying compressed air thereto, having a suitable shut valve 48*a* at the upper end. Water can of course be admitted to the tanks at other points than the valves 31, by other means, giving the mode of operation and results above described.

Having described our invention what we believe to be new is:

1. A submersible vessel comprising a storage tank and hollow means for ballasting same; means on said tank and hollow ballasting means for admitting water to said tank, and ballasting means to submerge said vessel; the tank having an inlet conduit to connect said tank to the discharge line of a submarine oil well, a separator in said inlet conduit, and a conduit connecting the separator to the tank, the separator having a gas discharge conduit, and a gas discharge pipe connecting the tank to the first-named discharge conduit.

2. A submersible vessel comprising a storage tank, ballasting means therefor, means on said tank and ballasting means for admitting water to the ballasting means and storage tank and means for connecting the tank to the discharge line of a submarine well containing oil and gas, said connecting means comprising a separator and an inlet pipe joining the separator to the tank, a gas discharge line leading from the separator and a gas discharge line leading from the tank to the first-named gas discharge line, valve means at the junction of said gas discharge lines, means controlled from within the separator to stop the flow of gas and oil into said tank when tank is filled, a discharge valve for venting water from said tank, a float for controlling said valve, a latch for releasing said float controlled by the oil, and a valved connection between said connecting means and said ballasting tanks.

3. A submersible vessel comprising a storage tank, ballasting means therefor, means on said tank and ballasting means for admitting water to the tank and ballasting means and means for connecting the tank to the discharge line of a submarine well containing oil and gas, said connecting means comprising a separator and an inlet pipe connecting the separator to the tank, a gas discharged line leading from the separator and a gas discharge line leading from the tank to the first-named gas discharged line, valve means at the junction of said discharge lines, means controlled from within the separator to stop the flow of gas and oil into said tank when tank is filled.

4. A submersible vessel comprising a storage tank, ballasting means therefor, means on the tank and ballasting means for admitting water to the storage tank and ballasting means and means for connecting the tank to the discharge line of a submarine well containing oil and gas, a discharge valve for venting water from said tank, a float connected to said valve to open and close it, a latch for holding said valve closed, said latch being controlled by the oil and a second float connected to the latch for lifting said latch as the oil enters said tank.

5. A submersible vessel comprising a storage tank, ballasting means therefor, means on said tank and ballasting means for admitting water to the tank and ballasting means and means for connecting the tank to the discharge line of a submarine well containing oil and gas, said connecting means comprising a separator and an inlet pipe connecting the separator to the tank, a gas discharge line leading from the separator, means controlled from within the separator to stop the flow of gas and oil into said tank when tank is filled, a discharge valve venting water from said tank, a float for controlling said valve means, a latch for releasing said float controlled by the oil, and a valved connection between said connecting means and said ballasting means.

6. A submersible barge comprising a storage tank and hollow means for ballasting same, means on the tank and said means for admitting water to said tank and ballasting means to submerge said vessel, connecting means comprising a coupling to join said tank to the discharge line of a submarine well containing oil and gas, and means for imparting buoyancy to the ballasting means to raise said barge when oil has filled said tank, said connecting means including a separator for oil and gas on the barge between the tank and said discharge line, a second discharge line for the gas leading from said separator away from said barge, and a valved connection between said connecting means and said ballasting means.

7. A submersible barge comprising a storage tank and hollow means for ballasting same, means on said tank and said hollow means for admitting water to said tank and hollow means to submerge said barge, connecting means comprising a coupling to join the tank to the discharge line of a submarine oil well, and means for imparting buoyancy to the ballasting means to raise said barge when oil has filled said tank, said means for imparting buoyancy also having valve control connection with said connecting means.

8. A submersible barge comprising a storage tank, hollow means for ballasting said tank, means on the tank and said hollow means for admitting water to the tank and hollow ballasting means, connecting means for joining the tank to the flow line of a submarine oil well to accumulate oil over the water therein, means controlled by the oil in the tank for venting the water therefrom as the oil fills the tank, and for stopping the outflow of said water when said tank is full of oil, said barge having an oil separator between it and said flow line, and means operable from within the separator to stop the inflow of oil when the tank is filled.

9. A submersible barge comprising a storage tank, a ballasting tank at each side of said storage tank, means on said storage and ballasting tanks for admitting water to the storage tank and ballasting tanks to submerge said barge, connecting means comprising a coupling to join the storage tank to the discharge line of a submarine oil well, means for imparting buoyancy to the ballasting tanks to float said barge when oil has filled the storage tank, said connecting means including a separator for oil on the barge between the storage tank and the flow line, means controlled from within the separator to stop the flow of oil into the tank when the tank is filled, a valved connection between the connecting means and said ballast tanks, and another discharge line for the gas leading from said separator away from said barge.

10. A submersible barge comprising a storage tank, hollow means for ballasting said storage tank, means for admitting water to the storage tank and said ballasting means, means comprising a separator for connecting the storage tank to the discharge line of a submarine oil well, and means controlled by the oil in the storage tank for venting the water therefrom as the oil fills the tank, and sealing said storage tank when the oil reaches a predetermined depth therein, said separator also having means operable by the oil therein for stopping the inflow of said oil when the tank is full, said last-named means comprising a valve in said discharge line.

11. A submersible vessel comprising a storage tank, hollow means for ballasting said storage tank, means on said storage tank and ballasting means for admitting water to the storage tank and ballasting means, means for connecting the storage tank to the discharge line of a submarine oil well and means operable by the oil in the tank for venting the water therefrom as the oil fills the tank, and sealing said tank when the oil reaches a pre-determined depth therein, said vessel having an oil separator between it and said discharge line, and a shut-off valve in said line operable from within the separator to stop the flow when the tank is filled.

12. A submersible vessel comprising a storage tank, hollow means for ballasting said tank, means for admitting water to the tank, means for connecting the tank to a flow line of a submarine oil well to admit oil upon said water, a valve adjacent the bottom of the tank for venting the water under the oil from the tank, a float responsive to the buoyant effect of the water connected to the valve to open the valve, and a float adjacent the upper part of the tank responsive to the buoyant effect of the oil, said last-named float having a latch connection with the first-named float to release the first-named float and allow the valve to open when the oil enters the tank.

13. A submersible barge comprising a storage tank, means for ballasting said tank, means on said tank and said ballasting means to admit water to said tank, means for connecting the storage tank to the flow line of a submarine oil well to admit oil to the tank upon the water therein, means comprising a valve adjacent the bottom of the tank for venting the water therein, a float responsive to the buoyancy of the water connected to said valve to open the valve, a float adjacent the top of the tank and a latch connection between said last-named float and the first-named float to maintain the valve closed until the oil enters said tank.

14. A submersible barge comprising as torage tank, means for ballasting the storage tank, means on said tank and ballasting means for admitting water to said tank and said ballasting means, means for connecting the storage tank to the discharge line of a submarine oil well to admit oil at the top of the tank on said water, a valve at the lower part of said tank for venting water from said tank, a float connected to said valve to be operated by the buoyancy of the water to open said valve, a second float near the upper part of the tank and a latch connection between said floats, the float at the upper part of the tank being operable by the buoyancy of the oil, so that as the oil enters the tank said latch is released and valve can open.

References Cited in the file of this patent

UNITED STATES PATENTS

| | | |
|---|---|---|
| 827,716 | Eastwood | Aug. 7, 1906 |
| 1,201,051 | Jack | Oct. 10, 1916 |
| 1,427,526 | Frahm | Aug. 29, 1922 |
| 2,359,366 | Katcher et al. | Oct. 3, 1944 |
| 2,383,840 | Benckert | Aug. 28, 1945 |
| 2,594,105 | Watts | Apr. 22, 1952 |
| 2,631,558 | Harris | Mar. 17, 1953 |
| 2,710,071 | Kinser et al. | June 7, 1955 |
| 2,731,168 | Watts | Jan. 17, 1956 |